United States Patent
Räsänen

(10) Patent No.: US 8,688,842 B2
(45) Date of Patent: Apr. 1, 2014

(54) METHODS, APPARATUSES, SYSTEM, AND RELATED COMPUTER PROGRAM PRODUCT FOR USER EQUIPMENT ACCESS

(75) Inventor: Juha A. Räsänen, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 424 days.

(21) Appl. No.: 12/191,202

(22) Filed: Aug. 13, 2008

(65) Prior Publication Data

US 2009/0055543 A1 Feb. 26, 2009

(30) Foreign Application Priority Data

Aug. 21, 2007 (EP) .................................... 07114692

(51) Int. Cl.
*G06F 15/16* (2006.01)
(52) U.S. Cl.
USPC ........................... 709/227; 709/229; 370/230
(58) Field of Classification Search
USPC .................... 709/227, 229; 370/230
See application file for complete search history.

(56) References Cited

U.S. PATENT DOCUMENTS

| | | | | |
|---|---|---|---|---|
| 6,452,942 | B1* | 9/2002 | Lemieux | 370/468 |
| 6,873,854 | B2* | 3/2005 | Crockett et al. | 455/518 |
| 7,167,919 | B2* | 1/2007 | Iwamoto et al. | 709/229 |
| 7,272,639 | B1* | 9/2007 | Levergood et al. | 709/218 |
| 7,512,784 | B2* | 3/2009 | Skemer | 713/155 |
| 7,522,581 | B2* | 4/2009 | Acharya et al. | 370/352 |
| 7,920,549 | B2* | 4/2011 | Alt et al. | 370/352 |
| 8,213,311 | B2* | 7/2012 | Pan et al. | 370/232 |
| 2004/0107284 | A1* | 6/2004 | Koperda et al. | 709/229 |
| 2005/0047345 | A1* | 3/2005 | Suh | 370/235 |
| 2007/0101414 | A1 | 5/2007 | Wing et al. | |
| 2007/0239839 | A1* | 10/2007 | Buday et al. | 709/208 |
| 2007/0297390 | A1* | 12/2007 | Skog et al. | 370/352 |
| 2009/0303971 | A1* | 12/2009 | Kim et al. | 370/338 |

FOREIGN PATENT DOCUMENTS

| | | |
|---|---|---|
| CN | 1592418 A | 3/2005 |
| CN | 1601972 A | 3/2005 |
| WO | WO-2007/055724 A2 | 5/2007 |

OTHER PUBLICATIONS

Media Session Authorization, Jan. 31, 2006, Cisco System, D. Wing.*
Digital Cellular Telecommunications (Phase 2+); Universal Mobile Telecommunications System I (UMTS); IP Multimedia Subsystem (IMS); Stage 2 (#GPP TS 23.228 version 7.8.0 Release 7), vol. 3-SA2, No. v780, Jun. 2007.

(Continued)

*Primary Examiner* — David Lazaro
*Assistant Examiner* — Marie Georges Henry
(74) *Attorney, Agent, or Firm* — Harrington & Smith

(57) ABSTRACT

It is disclosed a method comprising holding access information relating to a terminal and a first network entity external to a currently visited network of the terminal, the access information being associated with a first network plane below a second network plane relating to network session initiation, and signaling, based on the second network plane, the held access information to a controlling entity; a method comprising receiving the signaled access information, the receiving being performed based on the second network plane, and relaying, based on the second network plane, the received access information to a second network entity; and a method comprising receiving the relayed access information, the receiving being performed based on the second network plane, and configuring the first network plane based on the access information.

20 Claims, 3 Drawing Sheets

(56) References Cited

OTHER PUBLICATIONS

3rd Generation Partnership Project; Technical Specification Group Core Network and Terminals; IP Multimedia Call Control Protocol based on Session Initiation Protocol (SIP) and Session Description Protocol (SDP); Stage 3; 3GPP TS 24.299 V5.19.0 (Jun. 2007).
Universal Mobile Mobile Telecommunications System (UMTS); Policy and Charging Control over Rx reference point (3GPP TS 29.214 version 7.1.0. Release), vol. 3-CT3, No. v710, Jun. 2007.
Rosenberg et al. "Session Traversal Utilities for (NAT) (STUN)". Jul. 8, 2007, pp. 1-47.
Rosenberg et al. "Obtaining Relay Addresses from Simple Traversal Underneath NAT (STUN)". Mar. 4, 2007, pp. 1-45.
Rosenberg et al. "Interactive Connectivity Establishment (ICE): A Protocol for Network Address Translator (NAT) Traversal for Offer/Answer Protocols". Jul. 9, 2007, pp. 1-112.
Boulton et al. "Best Current Practices for NAT Traversal for SIP". Jul. 9, 2007, pp. 1-59.
Wing, D. "Media Session Authorization draft wing". Jan. 31, 2006, pp. 1-14.
3rd Generation Partnership Project: Technical Specification Group Core Network and Terminals; Policy and Charging Control over Rx reference point; 3GPP TS 29.214 W7.1.0 (Jun. 2007).
International Search Report for PCT Application No. PCT/EP2008/059876.
Digitial cellular telecommunications systems (PHASE2+); Universal Mobile Telecommunications System (UMTS); Policy and Charging control architecture (3GPP TS 23.203 version 7.3.0 Release 7); ETSI TS 1238 228 ETSI Standards Jun. 2007 XP 014037747).
Stiemerling, et al, "NAT/Firewall NSIS Signaling Layer Protocol (NSLP)", NSIS Working Group, Internet-Draft, (Jul. 2007), (79 pages).

* cited by examiner

METHODS, APPARATUSES, SYSTEM, AND RELATED COMPUTER PROGRAM PRODUCT FOR USER EQUIPMENT ACCESS

FIELD OF THE INVENTION

The present invention relates to UE (user equipment) access to networks. More specifically, the present invention relates to methods, apparatuses, a system and a related computer program product e.g. related to IMS (IP (Internet Protocol) Multimedia Subsystem) using various methods to enable communication between domains, e.g. access network NAT (network address translation) traversal.

BACKGROUND

In 3GPP (3$^{rd}$ Generation Partnership Project), there have been discussions related to user equipment access.

Namely, 3GPP has defined (e.g. from Release 6 onwards) an ALG (application level gateway) and NAT-GW (NAT gateway) based method for traversal of uncontrolled access network NATs, refer e.g. to 3GPP TS (technical specification) 23.228, Annex G, and TS 24.229.

In case a NAT device is interposed between a UE and an IMS core network, e.g. the AF/P-CSCF (application function/proxy call session control function) is configured to determine the existence of the NAT device e.g. by comparing the IP addresses in received SIP/SDP (session initiation protocol/session description protocol) messages. The SIP/SDP fields may contain the private domain IP address of the UE, while the data packets pass the NAT device and a sender may seem to have the public IP address allocated by the NAT device. Consequently, the ALG functionality in conjunction with the AF/P-CSCF may request public addresses from the NAT-GW and may modify the SIP/SDP accordingly before sending the message forward, and further, the ALG/AF/P-CSCF may initiate proper security measures (e.g. IP Sec tunneling) for the SIP signaling to be able to traverse the NAT device.

However, for example, the ALG and NAT-GW method imposes limitations:

The UE shall send a media packet first (i.e. before the UE can receive media packets) in order to have the NAT allocate an address and to let the NAT-GW get the address and use it as a destination address for downlink media packets.

The NAT releases the allocated address, if there is no traffic. Applications may have to send keep-alive messages.

When the UE is using e.g. visited network's services, media path is looped via the home network, if/when the home network's P-CSCF is used.

Traversal of all types of NATs cannot be supported.

To overcome the above-mentioned limitations related to the ALG and NAT-GW method, 3GPP has enhanced the NAT traversal methodology e.g. in Release 7 specifications with IETF (internet engineering task force) originated STUN (simple traversal of UDP (user datagram protocol) through NATs) and STUN relay based mechanisms, refer e.g. to 3GPP TS 23.228, Annex G.

With these methods, the UE may be able to get an external/public IP address by an enquiry to a STUN server and to insert the external/public address in the SIP/SDP level, thus making the ALG and NAT-GW functionality redundant, in addition to removing e.g. NAT type related and incoming session invitation related limitations of the ALG and NAT-GW method.

For example, FIG. 1 shows a reference model for ICE (interactive connectivity establishment) and Outbound Methodology in order to provide a general overview and architecture of IMS access with a NAT.

As shown in FIG. 1, a communication system 100 comprises a UE 101, a remote UE 101' and a network 102. The network 102 in turn comprises an optional NAT and FW (firewall) 1021, an optional remote NAT and FW 1021', a P-CSCF 1022, a PCRF (policy and/or charging rules function) 1023, a PCEF (policy and/or charging enforcement function) 1024, a STUN relay 1025, a STUN server 1025a, an S-CSCF (serving CSCF) 1026 and an optional IMS access gateway 1027. The UE 101 and the remote UE 101' comprise each ICE support by means of a STUN client/server. The UE 101 additionally comprises outbound support by means of a STUN client.

The STUN Function shown within the P-CSCF 1022 is a limited STUN Server for supporting so-called STUN keep-alive messages as described e.g. in TS 23.228, clause G.5.3.2.

For deployments where the IMS Access gateway 1027 (or other media manipulating functional entities, such as a MRFP (Multimedia Resource Function Processor)) is used, such functional entities shall be placed on the network side of the STUN server 1025a and STUN relay server 1025 (i.e. not between the UE 101 and the STUN server 1025a or STUN relay server 1025) as shown in FIG. 1. Otherwise, such functional entities will prevent STUN messages from reaching the STUN Relay 1025/Server 1025a e.g. outside of a session.

According to the above, a problem resides in that when a policy control is applied e.g. in the IMS network, the UE is not able to contact external servers of (or servers not advertised by) a visited network, unless the policy enforcement point (i.e. PCEF) is aware of the IP address of the server to be contacted and unless the PCEF has first set up a relevant filter (i.e. opened a gate) to pass through IP packets between the UE and the server. The UE cannot use e.g. STUN Relays/Servers external to (or not advertised by) the visited network to enable access network NAT traversal, even though the UE knows the address of the server (e.g. through pre-configuration or through other means).

Another problem resides in that the policy and/or charging enforcement function (PCEF) may not be aware that some of the filters serve for an encapsulation protocol between the UE/NAT and the external (or not advertised) (STUN Relay) server, and some of the filters serve for media streams carried inside the encapsulation protocol.

In consideration of the above, it is an object of the present invention to overcome one or more of the above drawbacks. In particular, the present invention provides methods, apparatuses, a system and a related computer program product for user equipment access.

According to the present invention, in a first aspect, this object is for example achieved by a method comprising:

holding access information relating to a terminal and a first network entity external to a currently visited network of the terminal, the access information being associated with a first network plane below a second network plane relating to network session initiation; and signaling, based on the second network plane, the held access information to a controlling entity.

According to further refinements of the invention as defined under the above first aspect, the signaling is performed based on utilizing an internet protocol multimedia subsystem registration phase;

the signaling is performed based on utilizing a separate session initiation protocol message exchange between the terminal and the controlling entity;

the separate session initiation protocol message is constituted by one of an options request and a register request of the session initiation protocol message;

the access information comprises at least one of network addresses of the terminal and the first network entity, network ports of the terminal and the first network entity, network address translation, a protocol used, an application offered by the first network entity, and a service offered by the first network entity;

the method according to the first aspect further comprises receiving information on network address translation;

the information on the network address translation comprises the existence of the network address translation and the address allocated by the network address translation;

the network addresses are constituted by at least one of internet protocol addresses and ports;

the network addresses are constituted by at least one of marked internet protocol addresses and ports indicating usage of an encapsulation protocol.

According to the present invention, in a second aspect, this object is for example achieved by a method comprising:

receiving signaled access information relating to a terminal and a first network entity external to a currently visited network of the terminal, the access information being associated with a first network plane below a second network plane relating to network session initiation, and the receiving being performed based on the second network plane; and relaying, based on the second network plane, the received access information to a second network entity.

According to further refinements of the invention as defined under the above second aspect, the access information comprises at least one of network addresses of the terminal and the first network entity, network ports of the terminal and the first network entity, network address translation, a protocol used, an application offered by the first network entity, and a service offered by the first network entity;

the method according to the second aspect further comprises sending information on network address translation;

the information on the network address translation comprises the existence of the network address translation and the address allocated by the network address translation;

the method according to the second aspect further comprises deriving the information on the network address translation from network addresses in session initiation protocol messages;

the network addresses are constituted by internet protocol addresses.

According to the present invention, in a third aspect, this object is for example achieved by a method comprising:

receiving relayed access information relating to a terminal and a first network entity external to a currently visited network of the terminal, the access information being associated with a first network plane below a second network plane relating to network session initiation, and the receiving being performed based on the second network plane; and configuring the first network plane based on the access information.

According to further refinements of the invention as defined under the above third aspect, the configuring further comprises establishing network traffic policy information based on the received access information and policy enforcement-based routing network traffic between the terminal and the first network entity based on the established network traffic policy information;

the established network traffic policy information comprises at least one policy and charging control rule;

the access information comprises one of information on a protocol used and information on an application defined by the at least one policy and charging control rule, and the established network traffic policy information is used for limiting the network traffic based on one of the protocol used and the application defined;

the at least one policy and charging control rule is used for limiting at least one of bandwidth, bit rate and traffic class of the network traffic;

the network traffic is one of an internet protocol data packet stream and a signaling message stream;

the network traffic is constituted by internet protocol data packets encapsulated by an encapsulation protocol, the establishing further establishes marked network traffic policy information indicating usage of the encapsulation protocol, and applying policy enforcement to encapsulated internet protocol data packets based on the marked network traffic policy information;

the first network plane is an internet protocol multimedia subsystem user plane and the second network plane is an internet protocol multimedia subsystem control plane.

According to the present invention, in a fourth aspect, this object is for example achieved by an apparatus comprising:

means for holding access information relating to the apparatus and a first network entity external to a currently visited network of the apparatus, the access information being associated with a first network plane below a second network plane relating to network session initiation; and means for signaling, based on the second network plane, the access information held by the means for holding to a controlling entity.

According to further refinements of the invention as defined under the above fourth aspect, the means for signaling is configured to signal based on utilizing an internet protocol multimedia subsystem registration phase;

the means for signaling is configured to signal based on utilizing a separate session initiation protocol message exchange between the terminal and the controlling entity;

the separate session initiation protocol message is constituted by one of an options request and a register request of the session initiation protocol message;

the access information comprises at least one of network addresses of the terminal and the first network entity, network ports of the terminal and the first network entity, network address translation, a protocol used, an application offered by the first network entity, and a service offered by the first network entity;

the apparatus according to the fourth aspect further comprises means for receiving information on network address translation;

the information on the network address translation comprises the existence of the network address translation and the address allocated by the network address translation;

the network addresses are constituted by at least one of internet protocol addresses and ports;

the network addresses are constituted by at least one of marked internet protocol addresses and ports indicating usage of an encapsulation protocol;

the apparatus is a terminal.

According to the present invention, in a fifth aspect, this object is for example achieved by an apparatus comprising:

means for receiving signaled access information relating to a terminal and a first network entity external to a currently visited network of the terminal, the access information being associated with a first network plane below a second network plane relating to network session initiation, and the means for receiving being configured to signal based on the second network plane; and means for relaying, based on the second network plane, the access information received by the means for receiving to a second network entity.

According to further refinements of the invention as defined under the above fifth aspect, the access information comprises at least one of network addresses of the terminal and the first network entity, network ports of the terminal and the first network entity, network address translation, a protocol used, an application offered by the first network entity, and a service offered by the first network entity;

the apparatus according to the fifth aspect further comprises means for sending information on network address translation;

the information on the network address translation comprises the existence of the network address translation and the address allocated by the network address translation;

the apparatus according to the fifth aspect further comprises means for deriving the information on the network address translation from network addresses in session initiation protocol messages;

the network addresses are constituted by internet protocol addresses;

the apparatus is a controlling entity.

According to the present invention, in a sixth aspect, this object is for example achieved by an apparatus comprising:

means for receiving relayed access information relating to a terminal and a first network entity external to a currently visited network of the terminal, the access information being associated with a first network plane below a second network plane relating to network session initiation, and the means for receiving being configured to receive based on the second network plane; and means for configuring the first network plane based on the access information.

According to further refinements of the invention as defined under the above sixth aspect, the means for configuring further comprises means for establishing network traffic policy information based on the access information received by the means for receiving and means for policy enforcement-based routing network traffic between the terminal and the first network entity based on the network traffic policy information established by the means for establishing;

the network traffic policy information established by the means for establishing comprises at least one policy and charging control rule;

the access information comprises one of information on a protocol used and information on an application defined by the at least one policy and charging control rule, and the means for policy enforcement-based routing is further configured to use the network traffic policy information established by the means for establishing for limiting the network traffic based on one of the protocol used and the application defined;

the means for policy enforcement-based routing is configured to use the at least one policy and charging control rule for limiting one of bandwidth, bit rate and traffic class of the network traffic;

the network traffic is one of an internet protocol data packet stream and a signaling message stream;

the network traffic is constituted by internet protocol data packets encapsulated by an encapsulation protocol, the means for establishing is further configured to establish marked network traffic policy information indicating usage of the encapsulation protocol, and the means for policy enforcement-based routing is further configured to apply policy enforcement to encapsulated internet protocol data packets based on the marked network traffic policy information;

the terminal is a user equipment.

According to further refinements of the invention as defined under the above fourth to sixth aspects, the first network entity is an external server;

the external server is a simple traversal of user datagram protocol through network address translations relay;

the second network entity is at least one of a policy and charging rules function and a policy and charging enforcement function;

the controlling entity is a proxy call session control function;

the first network plane is an internet protocol multimedia subsystem user plane and the second network plane is an internet protocol multimedia subsystem control plane;

the apparatus is implemented as a chipset or module.

According to the present invention, in a seventh aspect, this object is for example achieved by a system comprising:

an apparatus according to the above fourth aspect;

an apparatus according to the above fifth aspect; and an apparatus according to the above sixth aspect.

According to the present invention, in an eighth aspect, this object is for example achieved by a computer program product comprising code means for performing methods steps of a method according to any one of the above first to third aspects, when run on a computer.

In this connection, it has to be pointed out that the present invention enables one or more of the following:

Enabling the UE to use e.g. STUN Relays/Servers already known by the UE e.g. through pre-configuration or through other means;

Faster rule-based UE access e.g. to the IMS network due to "pinhole" access prior to session initiation;

An efficient NAT traversal method (ICE) may be applied e.g. in a policy controlled IMS network.

BRIEF DESCRIPTION OF THE DRAWINGS

An embodiment of the present invention is described herein below with reference to the accompanying drawings, in which.

DETAILED DESCRIPTION OF AN EMBODIMENT OF THE PRESENT INVENTION

An embodiment of the present invention is described herein below by way of example with reference to the accompanying drawings.

The embodiment may be summarized according to the following, without being restricted thereto:

The UE sends the IP address/port (and possible protocol or application identification of an external (or not advertised) server known by the UE) to the P-CSCF in an initial REGISTER or OPTIONS request.

The P-CSCF sends the information to the PCRF.

The PCRF establishes a PCC (policy and/or charging control) rule and sends the PCC rule to the PCEF.

The PCEF opens a corresponding gate to enable (PCC-rule-limited) communication between the UE and the external (or not advertised) server such as a STUN relay.

It is to be noted that for this description, the terms "IP address/port, STUN relay (server), control/user plane (e.g. in the IMS architecture), P-CSCF and IMS" are examples for "access information, external (or not advertised) server, network plane, controlling entity and network", without restricting the latter terms to the special technical or implementation details imposed to the terms "IP address/port, STUN relay server, control/user plane, P-CSCF and IMS".

Figure 1:
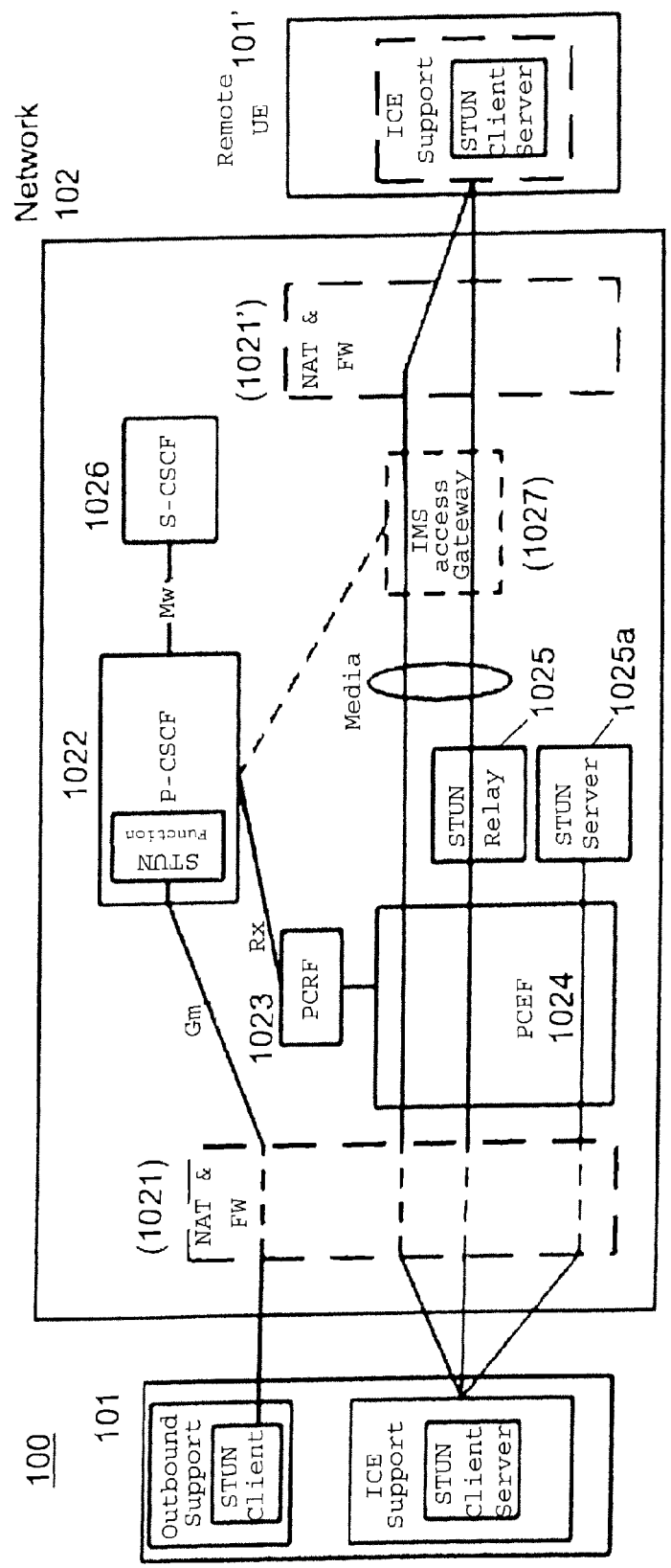
FIG. 1 shows the reference model for ICE and Outbound Methodology.
Figure 2:
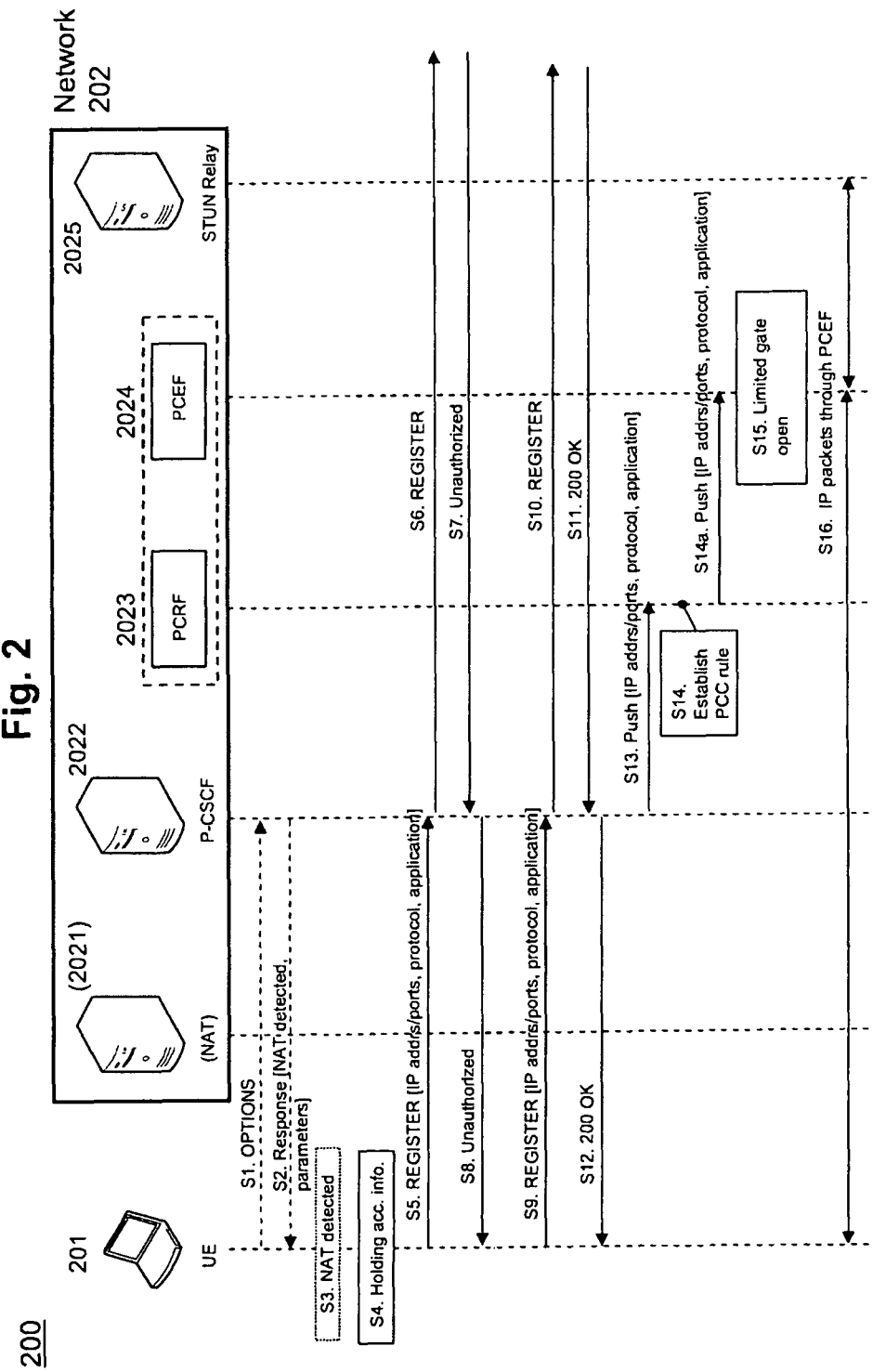
FIG. 2 shows a method for user equipment access according to an embodiment of the present invention.

FIG. 2 shows a method according to the present invention when e.g. REGISTER messaging is used by the UE to send the IP address/port (and possibly protocol/application/other information) e.g. to the IMS core such as the P-CSCF. Signaling between elements is indicated in horizontal direction, while time aspects between signaling are reflected in the vertical arrangement of the signaling sequence as well as in the sequence numbers.

As shown in FIG. 2, a communication system 200 may comprise a UE 201 and a network 202. The network 202 in turn may comprise an optional NAT 2021, a P-CSCF 2022, a PCRF 2023, a PCEF 2024 and a STUN Relay (Server) 2025 acting as a controlling entity. The PCRF 2023 and the PCEF 2024 may also be disposed as an integral entity, as indicated by the dashed box surrounding the functional blocks of the PCRF 2023/PCEF 2024.

As an optional preparatory measure, in step S1, e.g. the UE 201 may send an OPTIONS request to the P-CSCF 2022 via the optional NAT 2021. In step S2, the P-CSCF 2022 may return a response comprising e.g. an indication "NAT detected" and corresponding parameters to the UE 201. In step S3, the UE 201 may have information on the state "NAT detected". In other words, the existence of NAT may be detected by an OPTIONS enquiry from UE 201 to P-CSCF 2022.

In step S4, e.g. the UE 201 may perform holding access information (occasionally abbreviated "acc. info." hereinafter) relating to a terminal (e.g. UE 201) and a first network entity (e.g. STUN Relay 2025) external to (or not advertised by) a currently visited network of the terminal, the access information being associated with a first network plane (e.g. IMS user plane) below a second network plane (e.g. IMS control plane) relating to network session initiation.

In step S5, e.g. the UE 201 may perform signaling, based on the second network plane, the held access information to a controlling entity (e.g. P-CSCF 2022). In other words, e.g. the UE 201 may send a REGISTER request comprising e.g. the IP addresses/ports of the STUN Relay 2025 and UE 201/NAT 2021 and protocol and/or application identification (and possibly other related parameters), to the P-CSCF 2022. Such a parameter sending may alternatively be performed within step S9 to be described herein below.

Optionally, in step S6, e.g. the P-CSCF 2022 may perform sending the REGISTER request to an S-CSCF (not shown), to which request, in step S7, the S-CSCF may respond to e.g. with an "Unauthorized" message. In step S8, e.g. the P-CSCF 2022 may send the "Unauthorized" message to the UE 201.

Also optionally, in steps S9 to S12, e.g. the UE 201, the P-CSCF 2022 and the S-CSCF may perform completion of the (IMS) registration using secured messages. It is to be noted that the above-described signaling of the access information may also be performed in step S9 using e.g. a further register request.

In step S5 or alternatively in step S9, e.g. the P-CSCF 2022 may perform receiving (e.g. in an IMS register request) the signaled access information (e.g. IP addresses/ports of the UE 201 and the STUN relay 2025, protocol, application/service) relating to the terminal (e.g. UE 201) and the first network entity (e.g. STUN Relay 2025) external to (or not advertised by) the currently visited network of the terminal, the access information being associated with the first network plane (e.g. IMS user plane) below a second network plane (e.g. IMS control plane) relating to network session initiation, and the receiving being performed based on the second network plane.

In step S13, e.g. the P-CSCF 2022 may perform relaying (e.g. by pushing), based on the second network plane, the received access information to a second network entity (e.g. PCRF 2023 and/or PCEF 2024). Furthermore, also in step S13 (and optionally in step S14a), e.g. the PCRF 2023 (and the PCEF 2024) may perform receiving the relayed access information relating to the terminal (e.g. UE 201) and the first network entity (e.g. STUN Relay 2025) external to (or not advertised by) the currently visited network of the terminal, the access information being associated with the first network plane (e.g. IMS user plane) below the second network plane (e.g. IMS control plane) relating to network session initiation, and the receiving being performed based on the second network plane. In other words, the P-CSCF 2022 may push the IP addresses/ports of the STUN Relay 2025 and UE 201/NAT 2021 and e.g. protocol and/or application identification (and possibly other related parameters) e.g. to the PCRF 2023.

In steps S14 and S15, e.g. the PCRF 2023 and/or the PCEF 2024 may perform configuring the first network plane based on the access information. It is to be noted that in case the PCRF 2023 and PCEF 2024 are disposed as an integral entity, step S14a of relaying (e.g. pushing) the access information from the PCRF 2023 to the PCEF 2024 may be omitted.

In more detail, the configuring performed e.g. by the PCRF 2023 and/or the PCEF 2024 may comprise establishing (step S14) network traffic policy information (e.g. a PCC rule) based on the received access information. In other words, the PCRF 2023 may establish a PCC rule and optionally push the information to the PCEF 2024.

Further, in steps S15 and S16, e.g. the PCEF 2024 may perform policy enforcement-based routing of network traffic (e.g. IP data packets) between the terminal (e.g. UE 201) and the first network entity (e.g. STUN relay 2025) based on the established network traffic policy information. In other words, the PCEF 2024 may open gates according e.g. to the parameters and (e.g. protocol, application, bit rate/bandwidth or traffic class based) limitations of the PCC rule, and e.g. IP data packet exchange may take place through the PCEF 2024 between the UE 201 and the STUN Relay 2025.

According to further developments of the methods according to the present invention, the signaling performed e.g. by the UE 201 may be based on utilizing an internet protocol multimedia subsystem registration phase. Alternatively, the signaling performed e.g. by the UE 201 may be based on utilizing a separate session initiation protocol message (e.g. options/register request) exchange between the terminal and the controlling entity.

Additionally, the access information may comprise network addresses/ports of the terminal and the first network entity, network address translation, a protocol used, and/or an application/service offered by the first network entity.

Furthermore, information on network address translation (e.g. in step S3, "NAT detected") may be sent e.g. from the P-CSCF 2022 and may comprise the existence of the network address translation and the address allocated by the network address translation. In addition, e.g. the P-CSCF 2022 may perform deriving the information on the network address translation e.g. from network addresses in session initiation protocol messages.

Moreover, e.g. the PCRF 2023 and/or the PCEF 2024 may use the established network traffic policy information (e.g. PCC rule) for limiting the network traffic based on the protocol used or the application defined. Alternatively, a PCC rule may be used for limiting the bandwidth, bit rate or traffic class of the network traffic (e.g. IP data packet stream or signaling message stream).

Figure 3:
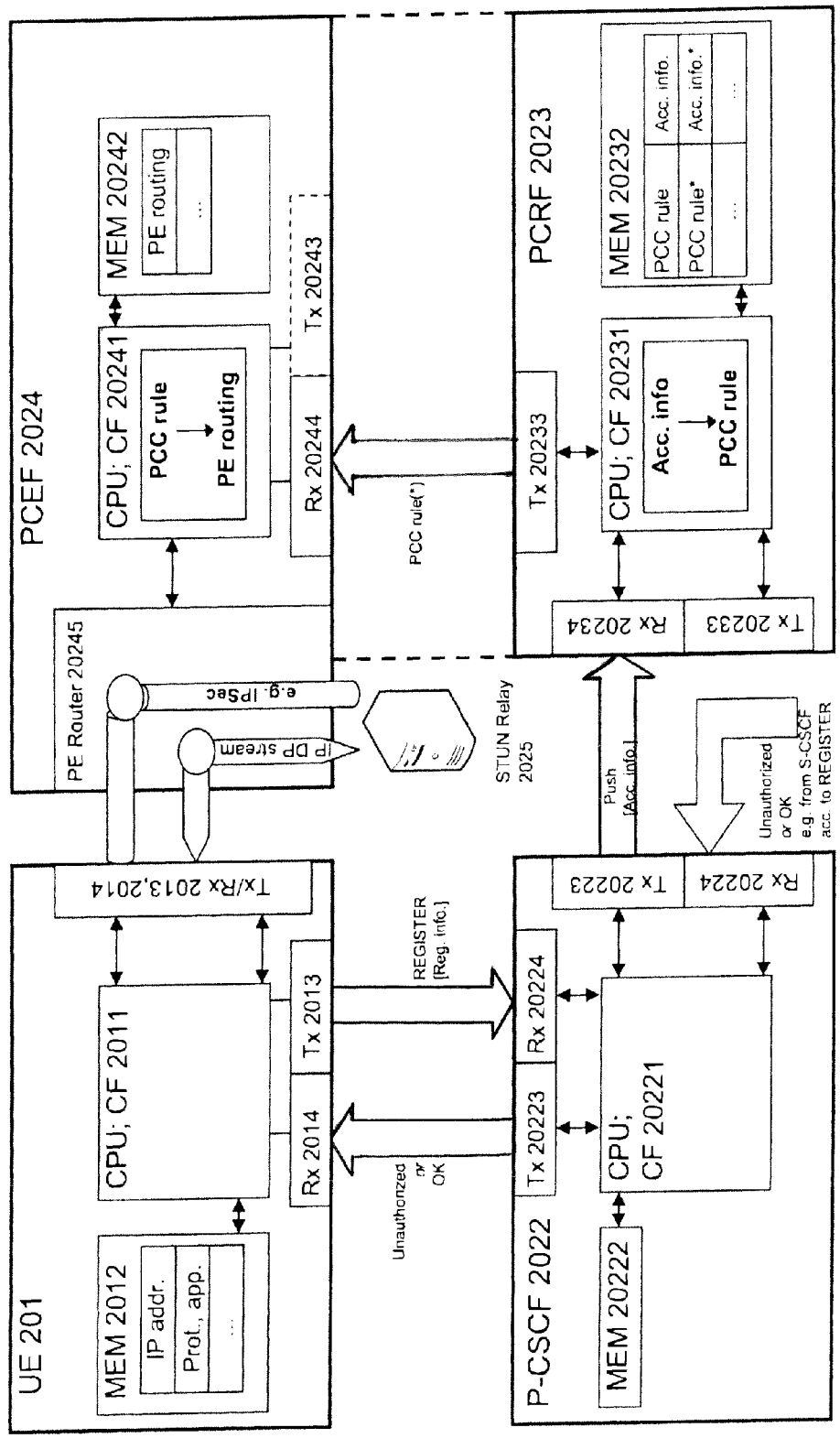
FIG. 3 shows respective apparatuses (e.g. UE, P-CSCF, and PCRF/PCEF) for user equipment access according to the embodiment of the present invention.

FIG. 3 shows respective apparatuses (e.g. UE 201, P-CSCF 2022, and PCRF 2023 and/or PCEF 2024) for user equipment access according to the embodiment of the present invention.

The UE 201 may comprise a central processing unit CPU or core functionality CF (referred to as "CPU" hereinafter) 2011, a memory 2012, a sender (or means for sending) Tx 2013 and a receiver (or means for receiving) Rx 2014. The P-CSCF 2022 may comprise a CPU 20221, a memory 20222, a sender (or means for sending) Tx 20223 and a receiver (or means for receiving) Rx 20224. The PCRF 2023 may comprise a CPU 20231, a memory 20232, a sender (or means for sending) Tx 20233 and a receiver (or means for receiving) Rx 20234. And, the PCEF 2024 may comprise a CPU 20241, a memory 20242, an optional sender (or means for sending) Tx 20243, a receiver (or means for receiving) Rx 20244 and a policy enforcement function and router (or means for policy enforcement-based routing) (occasionally abbreviated "PE Router" hereinafter) 20245.

The CPUs 20x1 (wherein x=1, 22, 23, and 24) may respectively be configured to process various data inputs and to control the functions of the memories 20x2, the senders 202x3 and the receivers 20x4 (CPU 20241 of the PCEF 2024 to control the PE router 20245). The memories 20x2 may respectively serve e.g. for storing code means for carrying out e.g. the respective method according to the invention, when run on the CPUs 20x1. It is to be noted that the (optional) senders 20x3 and the receivers 20x4 may alternatively be provided as respective integral transceivers (not shown). It is further to be noted that the senders/receivers may be implemented i) as physical senders/receivers for transceiving e.g. via the air interface (e.g. in case of the UE 201), or ii) as routing entities e.g. for sending/receiving data packets in a PS (packet switched) network (e.g. between P-CSCF 2022 and PCRF 2023), or iii) as functionalities for writing/reading information into/from a given memory area (e.g. in case of shared/common CPUs or memories e.g. between PCRF 2023 and PCEF 2024), or iv) as any suitable combination of i) to iii).

Furthermore, as indicated by the dashed connections between the functional blocks of the PCRF 2023 and the PCEF 2024, it is to be noted that the PCRF 2023 and the PCEF 2024 may also be implemented as an integral/combined entity. In that case, the CPUs 20231, 20241, the memories 20232, 20242, the (optional) senders 20233, 20243 and the receivers 20234, 20244 may respectively be common and/or shared resources.

For example, the memory 2012 of the UE 201 may be configured to constitute means for holding the access information (e.g. IP addresses/ports of the UE 201 and the STUN relay 2025, or protocol "prot."/application "app." used etc.) relating to the UE 201 and the first network entity (e.g. STUN Relay 2025) external to (or not advertised by) a currently visited network of the UE 201, the access information being associated with the first network plane (e.g. IMS user plane) below the second network plane (e.g. IMS control plane) relating to network session initiation.

And, e.g. the sender 2013 in conjunction with the CPU 2011 of the UE 201 may be configured to constitute means for signaling, based on the second network plane, the access information held by the means for holding 2012 to the controlling entity (e.g. P-CSCF 2022).

Then, e.g. the receiver 20224 of the P-CSCF 2022 may be configured for receiving the signaled access information relating to a terminal (e.g. UE 201) and the first network entity (e.g. STUN Relay 2025) external to (or not advertised by) the currently visited network of the terminal, the access information being associated with the first network plane (e.g. IMS user plane) below the second network plane (e.g. IMS control plane) relating to network session initiation, and the means for receiving being configured to signal based on the second network plane.

And, e.g. the sender 20223 in conjunction with the CPU 20221 of the P-CSCF 2022 may be configured to constitute means for relaying, based on the second network plane, the access information received by the means for receiving 20224 to the second network entity (e.g. PCRF 2023/PCEF 2024).

It is to be noted that e.g. the sender 20223 and receiver 20224 in conjunction with the CPU 20221 of the P-CSCF 2022 may be configured to obtain, from an S-CSCF (not shown) an indication e.g. of "Unauthorized" or "OK". Furthermore, the indication obtained may be returned, by the sender 20223 of the P-CSCF 2022, to the receiver 2014 of the UE 201.

Afterwards, e.g. the receiver 20234 of the PCRF 2023 may be configured for receiving the relayed access information relating to the terminal (e.g. UE 201) and the first network entity (e.g. STUN Relay 2025) external to (or not advertised by) the currently visited network of the terminal, the access information being associated with the first network plane (e.g. IMS user plane) below the second network plane (e.g. IMS control plane) relating to network session initiation, and the means for receiving 20234 being configured to receive based on the second network plane.

And, e.g. the CPUs 20231 and 20241, the memories 20232 and 20242 of the PCRF 2023 and the PCEF 2024 in conjunction with the PE router 20245 of the PCEF 2024 may be configured to constitute means for configuring the first network plane (e.g. IMS user plane) based on the access information.

In more detail, the above-defined means for configuring 20231, 20232, 20241, 20242, 20245 may comprise the CPU 20231 and the memory 20232 of the PCRF 2023 as means for establishing network traffic policy information (e.g. a PCC rule) based on the access information received by the means for receiving 20234.

Furthermore, the means for configuring may comprise the CPU 20241, the memory 20242 and the PE router 20245 as means for policy enforcement-based routing the network traffic between the terminal (e.g. UE 201) and the first network entity (e.g. STUN relay 2025) based on the network traffic policy information established by the means for establishing 20231, 20232. That is, the CPU 20241 of the PCEF 2024 may be configured to derive a policy enforcement-based routing scheme (occasionally abbreviated "PE routing (scheme)" hereinafter) (relating e.g. to bandwidth, bit rate or traffic class, or to the protocol used etc.) from the network traffic policy information (e.g. PCC rule).

Then, the network traffic between the UE 201 and the first network entity (STUN relay) 2025 e.g. via the second network entity (PCEF) 2024 may be constituted by a (n IP) data packet stream (as indicated by the two-sided arrow labeled "IP Dstream" between the functional blocks of the UE 201 and the STUN relay 2025 via the elliptic circle of the functional block of the PE router 20245 of the PCEF 2024).

It is to be noted that in case of integrally disposing the PCRF 2023 and the PCRF 2024 as an integral entity, the relaying of the network traffic policy information (e.g. PCC rule) established may be omitted. Consequently, establishing of the network traffic policy information from the access information, and determining a PE routing scheme from the network traffic policy information established may be performed by a common/shared CPU 20231, 20241 and a common/shared memory 20232, 20242. Alternatively, in such a case, the PE routing scheme may also be determined directly from the access information received.

According to further developments of the apparatuses according to the present invention, the signaling performed e.g. by the UE 201 may be based on utilizing an internet protocol multimedia subsystem registration phase. Alternatively, the signaling performed e.g. by the UE 201 may be based on utilizing a separate session initiation protocol message (e.g. options/register request) exchange between the terminal and the controlling entity.

Additionally, the access information may comprise network addresses/ports of the terminal and the first network entity, network address translation, a protocol used, and/or an application/service offered by the first network entity.

Furthermore, information on network address translation may be sent e.g. from the P-CSCF 2022 and may comprise the existence of the network address translation and the address allocated by the network address translation. In addition, e.g. the P-CSCF 2022 may perform deriving the information on the network address translation e.g. from network addresses in session initiation protocol messages.

Moreover, e.g. the PCRF 2023 and/or the PCEF 2024 may use the established network traffic policy information (e.g. PCC rule) for limiting the network traffic based on the protocol used or the application defined. Alternatively, a PCC rule may be used for limiting the bandwidth, bit rate or traffic class of the network traffic (e.g. IP data packet stream or signaling message stream).

In addition, the term "terminal" used hereinabove may also relate to a user equipment. And, the first network entity may also be constituted by an external (or not advertised) server such as the simple traversal of user datagram protocol through network address translations (STUN) relay. Further, the second network entity may be constituted by at least one of a policy and/or charging rules function (PCRF) and a policy and/or charging enforcement function (PCEF). Finally, the controlling entity may be constituted by a proxy call session control function (P-CSCF).

In addition, the UE 201, the P-CSCF 2022, the PCRF 2023 and/or the PCEF 2024 may be implemented as a chipset or module.

Without being restricted to the details following in this section, the embodiment of the present invention may be summarized as follows:

Exemplary operations to access an external or not advertised server, e.g. a STUN Relay:
  The UE sends external or not advertised server related information to the IMS network before trying to access the external or not advertised server.
    The information may comprise e.g. the IP addresses and ports of the server and the UE (or a possible NAT between the UE and the core network), used protocol, application/service offered by the server.
    The information can be sent e.g. utilizing the IMS registration phase and its signaling messages, or a separate SIP message exchange (e.g. OPTIONS request) between the UE and the IMS network (P-CSCF).
    The existence of a possible NAT between the UE and the core network, and the address allocated by the NAT, may be found out during the message exchange between the UE and the IMS network, e.g. recognized by the P-CSCF from the IP addresses in the SIP messages, and indicated to the UE in a SIP message.
  The P-CSCF sends the external or not advertised server related information to the policy and/or charging rules function (PCRF).
  The PCRF makes a PCC rule to enable limited media transfer (e.g. STUN Relay/Server related message exchange) between the UE and the external or not advertised server, and sends the PCC rule to the policy and/or charging enforcement function (PCEF).
  The PCEF passes through limited IP traffic according to the PCC rule. The limitation defined by the PCC rule can be for example:
    Only IP packets or signaling messages of the protocol or application defined in the PCC rule are passed through, and/or
    Only a limited bandwidth/bit rate and/or traffic class is allowed.

MODIFICATION OF THE EMBODIMENT

Alternatively, the configuration as described in conjunction with the above embodiment may be adapted for usage of an encapsulation or tunneling protocol (e.g. IPSec) for network traffic between the UE 201 and the first network entity (e.g. STUN Relay) 2025.

That is, e.g. the (IP) network addresses are constituted by a marked (IP) address (indicated by an asterisk: "Acc. info.*") indicating usage of an encapsulation protocol.

For example, the network traffic may be constituted by (IP) data packets encapsulated by an encapsulation protocol. Then, the establishing (see above-described step S14) or means for establishing 20231, 20232 of the PCRF 2023 may perform establishing marked network traffic policy information (also indicated by an asterisk: "PCC rule*") indicating usage of the encapsulation protocol.

Then, the policy enforcement-based routing (see above-described steps S15 and S16) or means for policy enforcement-based routing 20241, 20242, 20245 of the PCEF 20245 may apply policy enforcement-based routing the network traffic between the UE 201 and the first network entity (STUN relay) 2025 e.g. via the second network entity (PCEF) 2024 by use of an encapsulated (e.g. IP) data packet stream e.g. in an IPSec tunnel (as indicated by the IPSec tunnel symbol labeled "e.g. IPSec" between the functional blocks of the UE 201 and the STUN relay 2025 via the elliptic circle of the functional block of the PE router 20245 of the PCEF 2024).

Without being restricted to the detail following in this section, the modification of the embodiment of the present invention may be summarized as follows, wherein only statements deviating from the embodiment are given: Session establishment using addresses allocated by an external or not advertised STUN Relay:
  The UE may indicate or mark the IP addresses and ports of the IP tunnel/encapsulation protocol between the STUN Relay and the UE/NAT to separate the addresses/ports from the addresses/ports of the media streams carried encapsulated in the IP packets.
  The P-CSCF forwards the information to the PCRF which creates relevant PCC rules for the encapsulation protocol and the media streams, marking the PCC rule for the encapsulation protocol, and sends the PCC rules to the PCEF.

The PCEF detects the encapsulation IP packets and applies the PCC rules of the media streams to the IP packets carried by the encapsulation protocol.

In addition, the present invention also relates to a system which may comprise the UE 201, the P-CSCF 2022, the PCRF 2023 and the PCEF 2024 as defined herein above.

Further Embodiments

For the purpose of the present invention as described herein above, it should be noted that an access technology may be any technology by means of which a user equipment can access an access network (or base station, respectively). Any present or future technology, such as WiMAX (Worldwide Interoperability for Microwave Access) or WLAN (Wireless Local Access Network), Blue-Tooth, Infrared, and the like may be used; although the above technologies are mostly wireless access technologies, e.g. in different radio spectra, access technology in the sense of the present invention may also imply wirebound technologies, e.g. IP based access technologies like cable networks or fixed line.

a network may be any device, unit or means by which a station entity or other user equipment may connect to and/or utilize services offered by the access network; such services include, among others, data and/or (audio-) visual communication, data download etc.;

a user plane may be any device, unit, means or network layer in which e.g. the actual end-to-end data and/or content of the call and/or session may be transferred between a user equipment and another user equipment and/or server;

a control plane may be any device, unit, means or network layer in which e.g. the signaling functions necessary to set up, maintain, and release calls and/or connections may be performed;

the term "external" relating to a network entity may describe any device, unit or means which access information (e.g. IP address) is not known, not pre-configured and/or not advertised e.g. in a network currently visited by a user equipment;

generally, the present invention may be applicable in those network/user equipment environments relying on a data packet based transmission scheme according to which data are transmitted in data packets and which are, for example, based on the Internet Protocol IP. The present invention is, however, not limited thereto, and any other present or future IP or mobile IP (MIP) version, or, more generally, a protocol following similar principles as (M)IPv4/6, is also applicable;

a user equipment may be any device, unit or means by which a system user may experience services from an access network;

method steps likely to be implemented as software code portions and being run using a processor at the network element, are software code independent and can be specified using any known or future developed programming language as long as the functionality defined by the method steps is preserved;

generally, any method step is suitable to be implemented as software or by hardware without changing the idea of the present invention in terms of the functionality implemented;

method steps and/or devices, units or means likely to be implemented as hardware components at the UE, P-CSCF, PCRF and/or PCEF, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may alternatively be based on any security architecture capable e.g. of authentication, authorization, keying and/or traffic protection;

devices, units or means (e.g. UE, P-CSCF, PCRF and/or PCEF) can be implemented as individual devices, units or means, but this does not exclude that they are implemented in a distributed fashion throughout the system, as long as the functionality of the device, unit or means is preserved.

LIST OF ABBREVATIONS

3GPP $3^{rd}$ generation partnership project
AF Application function
ALG Application level gateway
CN Core network
CSCF Call session control function
GW Gateway
ICE Interactive connectivity establishment
IETF Internet engineering task force
IM IP multimedia
IMS IP multimedia subsystem
IP Internet protocol
NAT Network address translation
PCC Policy and/or charging control
PCEF Policy and/or charging enforcement function
PCRF Policy and/or charging rules function
PS Packet switched
SDP Session description protocol
SIP Session initiation protocol
STUN Simple Traversal of User Datagram Protocol (UDP) through NAT(s)
TS Technical specification
UE User equipment

The invention claimed is:
1. A method, comprising:
receiving with a network device, prior to network session initiation, access information relating to a terminal and a first network entity of a network external to a currently visited network of the terminal, the access information being received from the terminal over an internet protocol multimedia subsystem user plane below an internet protocol multimedia subsystem control plane and relating to network session initiation for accessing the first network entity, and the receiving being performed based on the internet protocol multimedia subsystem control plane; and
configuring, with the network device, in the network prior to network session initiation relating to accessing the first network entity, the internet protocol multimedia subsystem user plane based on the access information, wherein the configuring comprises:
establishing network traffic policy information based on the received access information, and
activating policy enforcement-based network traffic routing between the terminal and the first network entity based on the established network traffic policy information.

2. The method according to claim 1, wherein the network device comprises at least one of a policy and charging rules function device and a policy and charging enforcement function device.

3. The method according to claim 2, wherein the establishing the network traffic policy information comprises establishing at least one policy and charging control rule.

4. The method according to claim 3, wherein the access information comprises one of information on a protocol used and information on an application defined by the at least one policy and charging control rule, and wherein the established network traffic policy information is limiting the network traffic based on the one of the protocol used and the application defined.

5. The method according to claim 3, wherein the at least one policy and charging control rule is limiting at least one of bandwidth, bit rate and traffic class of the network traffic.

6. The method according to claim 2, wherein the network traffic is one of an internet protocol data packet stream and a signaling message stream.

7. The method according to claim 2, wherein the network traffic is constituted by internet protocol data packets encapsulated by an encapsulation protocol, and wherein the establishing further comprises establishing marked network traffic policy information indicating usage of the encapsulation protocol, and applying policy enforcement to encapsulated internet protocol data packets based on the marked network traffic policy information.

8. An apparatus, comprising:
at least one processor; and
at least one memory including computer program code, where the at least one memory and the computer program code are configured, with the at least one processor, to cause the apparatus to at least:
receive with a network device, prior to network session initiation, access information relating to a terminal and a first network entity of a network external to a currently visited network of the terminal, the access information being received from the terminal over an internet protocol multimedia subsystem user plane below an internet protocol multimedia subsystem control plane and relating to network session initiation for accessing the first network entity, and the receiving based on the internet protocol multimedia subsystem control plan; and
configure with the network device, in the network prior to network session initiation relating to accessing the first network entity, the internet protocol multimedia subsystem user plane based on the access information, wherein the configuring comprises
establishing network traffic policy information based on the received access information and
activating policy enforcement-based network traffic routing between the terminal and the first network entity based on the established network traffic policy information.

9. The apparatus according to claim 8, wherein the network device comprises at least one of a policy and charging rules function device and a policy and charging enforcement function device.

10. The apparatus according to claim 9, wherein the establishing the network traffic policy information comprises establishing at least one policy and charging control rule.

11. The apparatus according to claim 10, wherein the access information comprises one of information on a protocol used and information on an application defined by the at least one policy and charging control rule, and wherein the at least one memory including the computer program code is configured with the at least one processor to cause the apparatus to use the network traffic policy information to limit the network traffic based on one of the protocol used and the application defined.

12. The apparatus according to claim 10, wherein the activating the policy enforcement comprises using the at least one policy and charging control rule to limit one of bandwidth, bit rate and traffic class of the network traffic.

13. The apparatus according to claim 8, wherein the network traffic is one of an interne protocol data packet stream and a signaling message stream.

14. The apparatus according to claim 8, wherein the network traffic comprises internet protocol data packets encapsulated by an encapsulation protocol, wherein the at least one memory including the computer program code is further configured with the at least one processor to cause the apparatus to:
establish marked network traffic policy information indicating usage of the encapsulation protocol, and
apply policy enforcement to the encapsulated internet protocol data packets based on the marked network traffic policy information.

15. The apparatus according to claim 8, wherein the terminal is a user equipment.

16. The apparatus according claim 8, wherein the first network entity is a Session Traversal Utilities for NAT (STUN) server.

17. The apparatus according to claim 16, wherein the multimedia subsystem control plane and the multimedia subsystem user plane is associated with an Internet Protocol Multimedia Subsystem (IMS).

18. The apparatus according to claim 16, wherein the external server is a simple traversal of user datagram protocol through network address translations relay.

19. A non-transitory computer-readable medium embodying a computer program product comprising code means for performing, when run on a computer, a method comprising:
receiving with a network device, prior to network session initiation, access information relating to a terminal and a first network entity of a network external to a currently visited network of the terminal, the access information being received from the terminal over an internet protocol multimedia subsystem user plane below an internet protocol multimedia subsystem control plane and relating to network session initiation for accessing the first network entity, and the receiving being performed based on the internet protocol multimedia subsystem control plane; and
configuring with the network device, in the network prior to network session initiation relating to accessing the first network entity, the internet protocol multimedia subsystem user plane based on the access information, wherein the configuring comprises
establishing network traffic policy information based on the received access information, and
activating policy enforcement-based network traffic routing between the terminal and the first network entity based on the established network traffic policy information.

20. The non-transitory computer-readable medium according to claim 19, wherein the network device comprises at least one of a policy and charging rules function device and a policy and charging enforcement function device.

* * * * *

UNITED STATES PATENT AND TRADEMARK OFFICE
CERTIFICATE OF CORRECTION

| | | |
|---|---|---|
| PATENT NO. | : 8,688,842 B2 | Page 1 of 1 |
| APPLICATION NO. | : 12/191202 | |
| DATED | : April 1, 2014 | |
| INVENTOR(S) | : Juha A. Räsänen | |

It is certified that error appears in the above-identified patent and that said Letters Patent is hereby corrected as shown below:

In the Claims:

In Claim 8:
Column 15, line 44, "plan" should be deleted and --plane-- should be inserted.

In Claim 13:
Column 16, line 11, "interne" should be deleted and --internet-- should be inserted.

Signed and Sealed this
Twenty-seventh Day of May, 2014

Michelle K. Lee
*Deputy Director of the United States Patent and Trademark Office*